US012202018B2

(12) United States Patent
Genze

(10) Patent No.: US 12,202,018 B2
(45) Date of Patent: Jan. 21, 2025

(54) CLEANING APPARATUS

(71) Applicant: Ecoclean GmbH, Filderstadt (DE)

(72) Inventor: Alexander Genze, Simmerath (DE)

(73) Assignee: Ecoclean GmbH, Filderstadt (DE)

( * ) Notice: Subject to any disclaimer, the term of this patent is extended or adjusted under 35 U.S.C. 154(b) by 896 days.

(21) Appl. No.: 17/157,452

(22) Filed: Jan. 25, 2021

(65) Prior Publication Data

US 2021/0146408 A1 May 20, 2021

Related U.S. Application Data

(63) Continuation of application No. PCT/EP2019/070272, filed on Jul. 26, 2019.

(30) Foreign Application Priority Data

Jul. 26, 2018 (DE) ..................... 10 2018 118 067.5

(51) Int. Cl.
*B08B 6/00* (2006.01)
*B08B 5/02* (2006.01)
(Continued)

(52) U.S. Cl.
CPC .................. *B08B 6/00* (2013.01); *B08B 5/02* (2013.01); *B08B 7/02* (2013.01); *B08B 7/04* (2013.01); *B08B 13/00* (2013.01)

(58) Field of Classification Search
CPC ................................ A47L 15/22; A47L 15/23
(Continued)

(56) References Cited

U.S. PATENT DOCUMENTS 1,314,622 A 9/1919 Vaudreuil
2,933,093 A 4/1960 Handyside
(Continued)

FOREIGN PATENT DOCUMENTS

AT 516740 8/2016
DE 3229720 2/1984
(Continued)

OTHER PUBLICATIONS

German Patent Office, Search Report, issued in connection with German Application No. 10 2018 118 067.5, mailed May 10, 2019, 9 pages.
(Continued)

*Primary Examiner* — Tom Rodgers
(74) *Attorney, Agent, or Firm* — Hanley, Flight & Zimmerman, LLC

(57) ABSTRACT

The invention relates to a cleaning apparatus for cleaning workpieces, comprising a workpiece receptacle, a rotary part drivable in rotation about a main axis by way of a drive device, at least one nozzle supporting part which is drivable in rotation about an axis of rotation different from the main axis and on which at least one nozzle is arranged or formed at a distance relative to the axis of rotation, via which nozzle the workpiece can be acted upon by a cleaning medium, a charge generating device having at least one electrode for electrostatic charging and/or discharging of the workpiece and/or of the cleaning medium, wherein the at least one nozzle supporting part is held for rotation on the rotary part or wherein the workpiece receptacle is held to or formed by the rotary part.

28 Claims, 4 Drawing Sheets

(51) Int. Cl.

| | |
|---|---|
| ***B08B 7/02*** | (2006.01) |
| ***B08B 7/04*** | (2006.01) |
| ***B08B 13/00*** | (2006.01) |

(58) Field of Classification Search
USPC .......................................................... 15/1.51
See application file for complete search history.

(56) References Cited

U.S. PATENT DOCUMENTS

| | | | | |
|---|---|---|---|---|
| 2,996,042 | A | 8/1961 | Juvinall | |
| 3,496,949 | A | 2/1970 | Mercer | |
| 4,132,567 | A * | 1/1979 | Blackwood | B08B 6/00 134/200 |
| 4,677,704 | A * | 7/1987 | Huggins | A47L 13/40 15/1.51 |
| 4,741,351 | A | 5/1988 | Minkin | |
| 5,409,418 | A | 4/1995 | Krone-Schmidt et al. | |
| 5,542,443 | A | 8/1996 | Yura et al. | |
| 5,782,252 | A | 7/1998 | Lewis et al. | |
| 6,151,748 | A | 11/2000 | Earhart, Jr. et al. | |
| 6,263,888 | B1 | 7/2001 | Nomura et al. | |
| 8,006,710 | B2 | 8/2011 | Kaske | |
| 8,083,856 | B2 | 12/2011 | Abe et al. | |
| 9,125,541 | B2 * | 9/2015 | Forster | A47L 15/23 |
| 2005/0066539 | A1 | 3/2005 | Janocha et al. | |
| 2006/0249182 | A1 * | 11/2006 | Hayamizu | B08B 3/02 134/1 |
| 2006/0266388 | A1 | 11/2006 | Goddard | |
| 2007/0169796 | A1 | 7/2007 | Johnson et al. | |
| 2007/0186961 | A1 * | 8/2007 | Seasly | B08B 7/0021 134/103.3 |
| 2009/0139046 | A1 | 6/2009 | Kappos | |
| 2013/0034411 | A1 | 2/2013 | David et al. | |
| 2014/0075695 | A1 | 3/2014 | Kleiner et al. | |
| 2014/0202497 | A1 * | 7/2014 | Kreis | G01M 99/00 134/113 |
| 2016/0322240 | A1 * | 11/2016 | Lee | B08B 3/02 |
| 2019/0378729 | A1 * | 12/2019 | Randhawa | H01L 21/67051 |

FOREIGN PATENT DOCUMENTS

| | | |
|---|---|---|
| DE | 3518988 | 11/1986 |
| DE | 102008019456 | 11/2009 |
| DE | 102012006000 | 9/2013 |
| DE | 112009000361 | 12/2017 |
| EP | 0507294 | 10/1992 |
| EP | 1640077 | 3/2006 |
| EP | 1681106 | 7/2006 |
| EP | 2095754 | 9/2009 |
| EP | 2399499 | 12/2011 |
| EP | 2656772 | 10/2013 |
| EP | 3216527 | 9/2017 |
| FR | 2576532 | 8/1986 |
| WO | 2008025415 | 3/2008 |
| WO | 2011012234 | 2/2011 |
| WO | 2014090755 | 6/2014 |
| WO | 2017088002 | 6/2017 |

OTHER PUBLICATIONS

International Searching Authority, International Search Report, issued in connection with International Patent Application No. PCT/EP2019/070272, mailed Nov. 5, 2019, with English translation, 7 pages.

International Searching Authority, Written Opinion, issued in connection with International Patent Application No. PCT/EP2019/070272, mailed Nov. 5, 2019, 6 pages.

International Bureau, International Preliminary Report on Patentability, issued in connection with International Patent Application No. PCT/EP2019/070272, mailed Feb. 4, 2021, with English translation, 7 pages.

European Patent Office, "Communication of Intention to Grant A European Patent 71(3) EPC," issued in connection with European Patent Application No. 19746465.4, dated Mar. 31, 2023, 16 pages. [English Machine Translation Included].

European Patent Office, "Decision to Grant a European Patent 97(1) EPC," issued in connection with European Patent Application No. 19746465.4, dated Aug. 10, 2023, 4 pages. [English Machine Translation Included].

* cited by examiner

CLEANING APPARATUS

CROSS-REFERENCE TO RELATED APPLICATIONS

This application is a continuation application of international application number PCT/EP2019/070272, filed on Jul. 26, 2019, and claims the benefit of German application number 10 2018 118 067.5, filed on Jul. 26, 2018, which are incorporated herein by reference in their entirety and for all purposes.

FIELD OF THE INVENTION

The present invention relates to a cleaning apparatus for cleaning workpieces, in particular workpieces having particulate contaminants left behind on workpiece surfaces after the production process.

BACKGROUND OF THE INVENTION

Possible applications of the present invention lie particularly in workpieces in the fields of mechatronics and electronics, in workpieces made of plastics material, workpieces of the wood or furniture industry, where the particulate contaminants are, for example, residues of sawdust, or workpieces fabricated by generative manufacturing, where, for example, in 3D printing with metal, contaminants in the form of powder may be present within the workpiece and on the surface thereof.

An object underlying the present invention is to provide a cleaning apparatus for cleaning workpieces that permits a better cleaning result to be achieved.

SUMMARY OF THE INVENTION

In an aspect of the invention, a cleaning apparatus for cleaning workpieces comprises a workpiece receptacle, a rotary part drivable in rotation about a main axis by way of a drive device, at least one nozzle supporting part which is drivable in rotation about an axis of rotation different from the main axis and on which at least one nozzle is arranged or formed at a distance relative to the axis of rotation, via which nozzle the workpiece can be acted upon by a cleaning medium, a charge generating device having at least one electrode for electrostatic charging and/or discharging of the workpiece and/or of the cleaning medium, wherein the at least one nozzle supporting part is held for rotation on the rotary part or wherein the workpiece receptacle is held to or formed by the rotary part.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Figure 1:
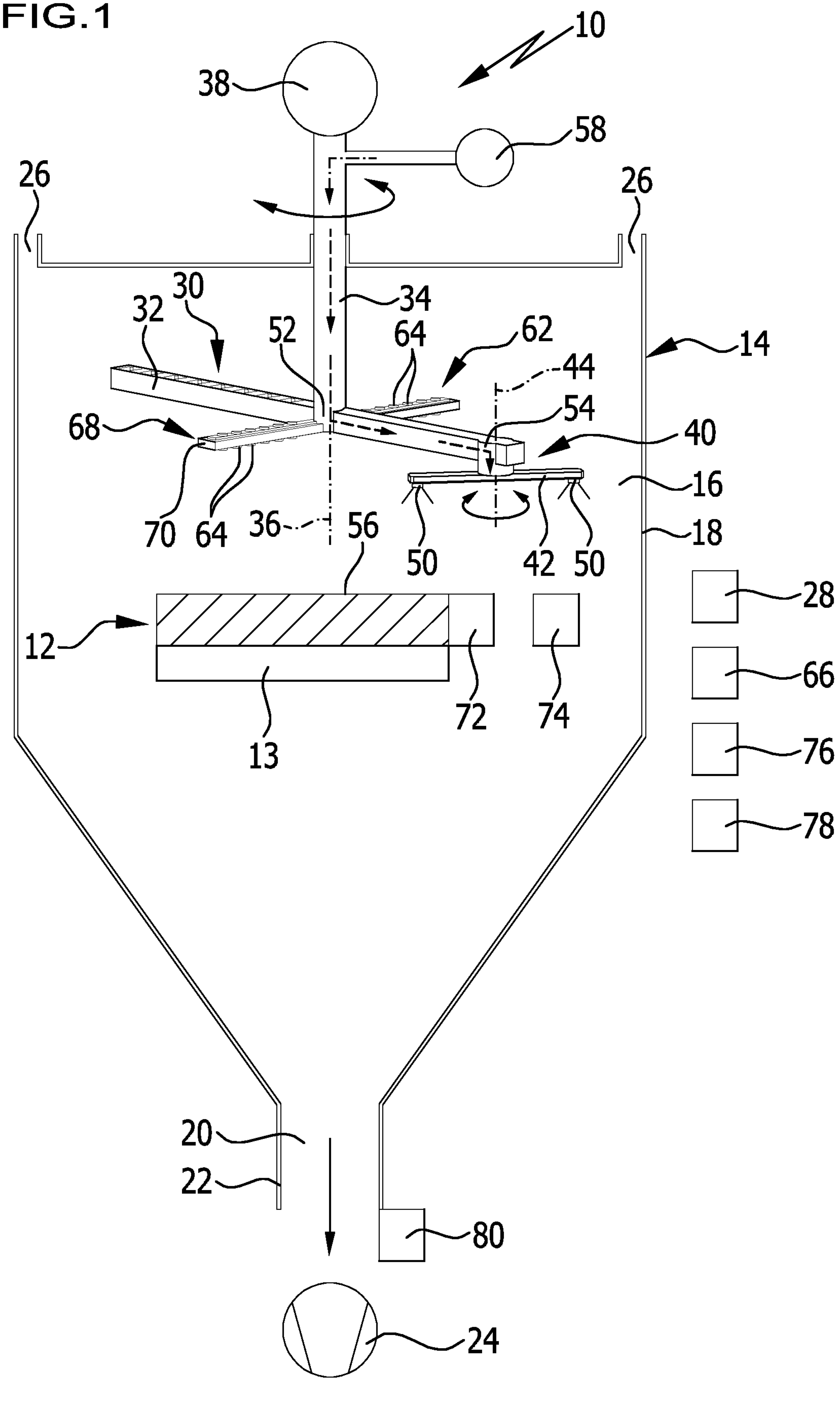
FIG. 1 shows, in a partly 2D/partly 3D view, a schematic representation of a cleaning apparatus in accordance with the invention.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a a cleaning apparatus for cleaning workpieces comprising a workpiece receptacle, a rotary part drivable in rotation about a main axis by way of a drive device, at least one nozzle supporting part which is drivable in rotation about an axis of rotation different from the main axis and on which at least one nozzle is arranged or formed at a distance relative to the axis of rotation, via which nozzle the workpiece can be acted upon by a cleaning medium, a charge generating device having at least one electrode for electrostatic charging and/or discharging of the workpiece and/or of the cleaning medium, wherein the at least one nozzle supporting part is held for rotation on the rotary part or wherein the workpiece receptacle is held to or formed by the rotary part.

In the cleaning apparatus in accordance with the invention, the workpiece can be acted upon by a cleaning medium via the at least one nozzle. For example and as will be explained in greater detail below, such action can be produced using positive pressure or negative pressure. The at least one nozzle can perform a superimposed motion with respect to the workpiece at the workpiece receptacle. In a solution in accordance with the invention, the at least one nozzle can rotate on the rotary part about the axis of rotation of the at least one nozzle supporting part, relative to which the nozzle is at a distance. In addition, the rotary part, and consequently the at least one nozzle supporting part, can rotate with the at least one nozzle about the main axis. In an alternative solution in accordance with the invention, the at least one nozzle arranged at a distance relative to the axis of rotation on the at least one nozzle supporting part can rotate about the axis of rotation. The rotary part, to which the workpiece receptacle is held or which forms the workpiece receptacle, can rotate about the main axis, for rotation of the workpiece about the main axis. Both solutions in accordance with the invention allow a pattern of application to be created on the workpiece that can be considered as being net-like. It is thereby possible for the action applied to the workpiece to be, in a sense, spread over an area without the at least one nozzle itself having to be configured for acting on the workpiece over an area thereof. The movement of the at least one nozzle about the axis of rotation and the relative movement of the nozzle supporting part to the workpiece as a result of the additional rotation of the rotary part around the main axis also makes it possible to capture contaminants of the workpiece in difficult-to-access places thereof, as are for example undercuts or recesses. The cleaning effect of the cleaning apparatus is also improved in particular by the presence of the charge generating device. Via the at least one electrode thereof, the workpiece with contaminants adherent thereto and/or the cleaning medium can be acted upon in order to specifically generate and/or dissipate electrostatic charges on the workpiece and on the contaminants. In particular, this allows dry particulate contaminants (for example dust or powder) to be removed by the cleaning medium. The workpiece can be acted upon through use of, for example, an ambient medium, in particular air, which can be ionized via the at least one electrode.

The cleaning apparatus in accordance with the invention is also characterized by a compact structure. For example, by the rotary part and the at least one nozzle supporting part, a dimension can be achieved that has, at most, substantially the dimensions of the workpiece, wherein substantially full coverage of the workpiece can be provided by the effective range of the at least one nozzle.

Accordingly, the cleaning apparatus in accordance with the invention is particularly suited to the cleaning of workpieces of the type mentioned at the outset in the fields of mechatronics, electronics and/or made of plastics material, in the field of wood or furniture industry, or to the cleaning of workpieces produced by generative manufacturing. However, the use of the cleaning apparatus is not limited thereto. Generally, for example, workpieces made of metal, ceramics or plastic can be cleaned. The workpieces can be, for example, engine parts or drive transmission parts, such as cylinder heads, cylinder blocks, housings, wheels or shafts. The workpieces can be, for example, component parts for electric motors, as are coil bodies, housings, bearings or shafts. The workpieces can originate in the field of medical engineering and be implants, for example. It is conceivable for the cleaning apparatus to be used for workpieces made of different materials (hybrid workpieces). Apart from the dry particulate contaminants that have already mentioned, larger forms of residues from working operations can be cleaned off, such as chips, blasting media, casting core residue or fine burrs. Film-like contamination such as that caused by cooling lubricant, oils, greases, release agents or abrasive material, or production residue from, for example, plastics processing, preferably can also be removed.

Provision may be made for the main axis and the axis of rotation of at least one nozzle supporting part to be oriented parallel to each other.

Alternatively or in addition, provision may be made for the main axis and the axis of rotation of at least one nozzle supporting part to be oriented at an angle to one another, in particular perpendicularly to one another. In the present case, this can also be understood to mean that the main axis and the axis of rotation are arranged at a skew angle relative to one another, wherein a plane containing the axis of rotation is pierced by the main axis at an angle and, in particular, perpendicularly.

Where two or more nozzle supporting parts are present, provision may be made for the axes of rotation thereof to be oriented parallel to each other.

Advantageously, a plurality of nozzles can be arranged or formed on a respective nozzle supporting part in order to enhance the cleaning effect.

Two or more nozzles can be of identical configuration. Alternatively or in addition, provision may be made for two or more nozzles to be of different configuration.

In order to make for a compact construction, provision may be made, for example, for the rotary part and at least one nozzle supporting part to be arranged in a common plane or to define a common plane.

For example, the cleaning apparatus can be configured with simple structure by the rotary part comprising or forming a holding arm. The holding arm is drivable in rotation about the main axis by way of a drive shaft for example.

Similarly, provision may be made for the at least one nozzle supporting part to comprise or form a support arm. The support arm is shaped in a bar-like configuration for example, and is held for rotation on the above mentioned holding arm of the rotary part.

Preferably, the cleaning apparatus comprises a plurality of nozzle supporting parts, each having at least one nozzle. The cleaning effect can thereby be enhanced.

For example, two or more nozzle supporting parts are positioned on opposite sides of the workpiece. This permits the workpiece to be acted upon by the cleaning medium on two surfaces thereof that face away from each other.

Alternatively or in addition, provision may be made that, in the case of two or more nozzle supporting parts, at least one nozzle supporting part is positioned above or below the workpiece and at least one nozzle supporting part is positioned adjacent a side of the workpiece. This affords the possibility of having the cleaning medium acting upon the workpiece on two surfaces thereof adjoining one another at an angle, for an enhanced cleaning effect.

Provision may be made for the main axis to be oriented perpendicularly to a plane defined by the workpiece receptacle or for the main axis to be oriented parallel to a plane defined by the workpiece receptacle or to lie in this plane. The plane of the workpiece receptacle can, for example, form a contact plane that coincides with a contact plane of the workpiece.

In a preferred embodiment, provision may be made for the axis of rotation to be oriented perpendicularly to a plane defined by the workpiece receptacle or for the axis of rotation to be oriented parallel to a plane defined by the workpiece receptacle or to lie in this plane.

A gas may be provided as the cleaning medium, and in the present case this can also be understood to refer to a gas mixture. The gas or gas mixture is, for example, air, $CO_2$, dry steam or an inert gas.

Alternatively or in addition, a liquid may be provided as the cleaning medium, and in the present case this can also be understood to refer to a liquid mixture. The liquid is in particular water or a mixture of water and cleaning agent.

It is also conceivable to use mixed media, for example gas/liquid, liquid/solid and/or gas/solid. A fluidic mixed medium such as saturated steam is conceivable.

Alternatively or in addition, the cleaning medium can be a particulate cleaning medium. For example, it is conceivable to use dry ice that is used with a carrier medium, in particular compressed air, for acting on the workpiece.

It is understood that the cleaning apparatus comprises at least one provision device for providing the cleaning medium. Provision may be made for the provision device to comprise a pump unit to impart a positive pressure or a negative pressure to the cleaning medium. Preferably, the cleaning apparatus can comprise a control device in order to adjust, in particular control and/or regulate, the supply of the cleaning medium.

Advantageously, a device for performing non-contact cleaning of the workpiece may be provided.

Non-contact cleaning can be performed, for example, through use of a plasma generating device. This can produce a plasma flame with which the workpiece can be cleaned and/or with which the workpiece can be activated or conditioned for subsequent processes.

Another example of non-contact cleaning is a light-generating device. Here, for example, a laser is used for cleaning and/or activating or conditioning of the workpiece for subsequent processes.

The action imparted to the workpiece can be, preferably predeterminable, continuous or variable. Preferably, this applies to the action imparted thereto by the cleaning medium and/or to the action imparted thereto by the at least one electrode of the charge generating device.

The drive device is provided for driving the rotary part. It is conceivable for the at least one nozzle supporting part to have an independent drive device associated therewith.

The drive device for the rotary part and/or a drive device for the at least one nozzle supporting part can be configured, for example, as an electric drive device and can in particular comprise an electric motor. For example, a drive motor for the at least one nozzle supporting part is arranged on the rotary part.

In an advantageous embodiment of the cleaning apparatus, the drive device for the rotary part and/or a drive device for the at least one nozzle supporting part can be configured as a pneumatic drive device, for example. To this end, for example, an air motor, and in particular compressed gas motor, can be used in order to impart rotation to the rotary part or the nozzle supporting part by flowing gas. The drive medium for the compressed gas motor can be the cleaning medium at the same time.

The drive device for the rotary part and/or a drive device for the at least one nozzle supporting part can, for example, form a drive relying on a differential pressure of the cleaning medium flowing through the at least one nozzle relative to a pressure of an ambient medium in a working chamber of the cleaning apparatus, wherein the working chamber can have ambient medium admitted thereto via at least one opening.

The drive device for the rotary part and/or a drive device for the at least one nozzle supporting part can, for example, be configured such that the nozzle supporting part and/or the rotary part are rotated by jet forces of the cleaning medium ejected through the at least one nozzle.

In a preferred embodiment of the invention, the at least one nozzle supporting part can advantageously be drivable about the axis of rotation as a result of the outflowing cleaning medium. The rotary part can, for example, be drivable by way of an electric drive device and can form or support the workpiece receptacle.

It may prove to be advantageous for the at least one nozzle supporting part to comprise at least one nozzle having a direction of outflow for the cleaning medium that is oriented transversely and in particular perpendicularly to the axis of rotation. For example, two or more nozzles are provided, one of which can be directed towards a surface of the workpiece, with a view to achieving as high a cleaning performance as possible. For example, the direction of outflow can be oriented parallel to the axis of rotation and/or transversely and in particular perpendicularly to a plane defined by the workpiece receptacle. At least one further nozzle can have its direction of outflow oriented transversely to the axis of rotation, in particular perpendicularly, in order to cause rotation of the nozzle supporting part by jet force.

In particular, the workpiece can be acted upon by the cleaning medium issuing under pressure from the at least one nozzle. Accordingly, the provision device for the cleaning medium can be configured for generating a positive pressure.

Alternatively or in addition, in the cleaning apparatus, provision may be advantageously made for the workpiece to be acted upon by cleaning medium entering the at least one nozzle using negative pressure. Accordingly, a negative pressure can be provided at the at least one nozzle to draw the cleaning medium through the nozzle and thereby produce a negative pressure action on a surface of the workpiece. With such an embodiment, the workpiece is arranged, for example, in a working space of a working chamber, which itself can have a positive pressure applied thereto in order to provide flow through the working chamber and into the at least one nozzle.

In a preferred embodiment of the cleaning apparatus, a flow channel for the cleaning medium is preferably formed in a drive shaft of the cleaning apparatus carrying the rotary part. Via the flow channel, for example, cleaning medium to be discharged via the at least one nozzle can be supplied or cleaning medium sucked in via the at least one nozzle can be discharged.

In a preferred embodiment of the cleaning apparatus, for example, a flow channel for the cleaning medium is preferably formed in a shaft of the cleaning apparatus carrying the at least one nozzle supporting part. By way of example, the cleaning medium passes through the flow channel and can flow out via the at least one nozzle.

Provision may be made for the at least one nozzle supporting part to be supported for rotation by a non-driven holding part. The holding part can, for example, form a hollow body through which the cleaning medium is suppliable to the nozzles. For example, the holding part is stationarily fixed to a wall of a working chamber for the workpiece.

The at least one nozzle can, for example, be configured for low-pressure applications. A typical low pressure range at the nozzle is approximately −500 mbar to 10,000 mbar for example.

Alternatively or in addition, the at least one nozzle can be configured for the high-pressure range, for example up to approximately 50 bar.

The at least one nozzle can be, for example, a round nozzle or a flat jet nozzle.

When using a negative pressure, in particular in the above-mentioned working chamber, pressure application can be in the range of approximately −100 mbar to −500 mbar, for example.

It is advantageous if at least one direct voltage electrode and/or at least one alternating voltage electrode is provided as the electrode. Accordingly, the charge generating device can be configured for applying direct voltage and/or alternating voltage to the electrode(s). It is conceivable to discharge and/or charge, preferably alternately, the workpiece and/or the cleaning medium.

Advantageously, the charge generating device comprises a plurality of electrodes. At least two electrodes can be of identical configuration. Alternatively or in addition, provision may be made for at least two electrodes to be of different configuration.

Preferably, provision may be made for at least one electrode to be arranged on the rotary part. Alternatively or in addition, at least one electrode can advantageously be arranged on a nozzle supporting part. By the motion of the rotary part and/or the nozzle supporting part, the at least one electrode moves relative to the workpiece. It is thereby possible, via the charge generating device, to act upon different areas of the workpiece as a function of time. The cleaning effect is thereby enhanced.

In a preferred embodiment of the cleaning apparatus, at least one electrode can be held on a drive shaft of the cleaning apparatus carrying the rotary part.

In a preferred embodiment of the cleaning apparatus, at least one electrode can be arranged spatially remote from the rotary part and from the at least one nozzle supporting part. For example, at least one electrode is arranged on a wall of a working chamber for the workpiece or on a supply conduit for the cleaning medium. This provides a way for the cleaning medium to be preferably acted upon via at least one electrode and, in particular, for it to be ionized thereby.

Alternatively or in addition, provision may be made for the workpiece to be acted upon via the at least one electrode.

According to what has been said, the at least one electrode can be movable relative to the workpiece and/or can be stationarily arranged on the cleaning apparatus.

The cleaning apparatus can comprise a support part having arranged thereon a plurality of electrodes. This enables a compact construction of the cleaning apparatus while enhancing the cleaning effect. The support part is, for example, a support arm. By way of example, the support part can be held to the rotary part, it can be held to a nozzle supporting part or it can be formed by the rotary part and by the nozzle supporting part.

Provision may be made for a respective electrode to have associated therewith a counter electrode, this being arranged opposite the electrode with respect to the workpiece.

It has proved to be advantageous for electrodes to be provided on sides of the workpiece opposite each other and/or adjacent a side of the workpiece. For example, different surfaces of the workpiece that face away from each other can each be acted upon by at least one electrode. Alternatively or in addition, surfaces of the workpiece that are arranged at an angle to each other can be acted upon.

Advantageously, provision may be made for the charge generating device to be configured for ionizing an ambient medium, in particular air, within a working chamber for the workpiece. The ambient medium can be ionized by the electrode, in turn enabling the workpiece to be charged and/or discharged.

As has already been mentioned, it is advantageously provided that the charge generating device is configured for ionizing the cleaning medium, wherein the workpiece can be acted upon utilizing the ionized cleaning medium. For example, the ionized cleaning medium is applied via the at least one nozzle using positive pressure. Alternatively or in addition, provision may be made for the cleaning medium to be sucked in via the at least one nozzle.

It has already been mentioned that the cleaning apparatus preferably comprises a control device.

Preferably, the control device is in operative communication with a drive device for the rotary part and/or for the at least one nozzle supporting part, in order to influence the rotational motion of the rotary part and/or of the nozzle supporting part. For example, a rotational speed of the rotary part about the main axis and/or a rotational speed of at least one nozzle supporting part about an axis of rotation is adjustable via the control device. The respective rotational speed is preferably controllable and/or regulatable. Advantageously, the respective rotational speed can be predetermined by an operator.

It has proved to be advantageous, in a preferred embodiment, for a rotational speed of the rotary part about the main axis to be greater than 0 and up to approximately 5 revolutions per second.

In a preferred embodiment of the cleaning apparatus, the rotational speed of at least one nozzle supporting part about the axis of rotation can be, for example, between approximately 50 and 1,000 revolutions per minute.

Advantageously, provision is made for the direction of rotation of the rotary part about the main axis and/or the direction of rotation of at least one nozzle supporting part about the axis of rotation to be adjustable, in particular controllable and/or regulatable. The same applies to possible changes in rotational direction. For example, the direction of rotation or the change in rotational direction can be predetermined by a user.

It is understood that the rotational motion of the rotary part and/or of at least one nozzle supporting part can be adjusted, in particular controlled and/or regulated, when the cleaning apparatus is operating.

It has proved to be advantageous for the rotational speed of the rotary part about the main axis to be less than the rotational speed of at least one nozzle supporting part about the respective axis of rotation thereof.

Provision may be made for the rotational speeds of the rotary part and the rotational speeds of the at least one nozzle supporting part to not occur at integer multiples of each other, in order to ensure better coverage of the surfaces of the workpiece when acted upon by the cleaning medium.

As has already been mentioned, the cleaning apparatus can comprise a working chamber. The working chamber can comprise a working space and a wall bounding same.

It has proved to be advantageous for the cleaning apparatus to comprise a working space for receiving the workpiece, in which working space are received the rotary part and the at least one nozzle supporting part and, preferably, the at least one electrode, and for at least one opening to be provided at the working space for applying a positive pressure or a negative pressure to the working space. For example, a negative pressure is applied to the working space and the cleaning medium exiting the at least one nozzle is discharged. The cleaning medium can be drawn through the nozzle by negative pressure alone. Alternatively, a positive pressure device can be provided for supplying the cleaning medium. Conversely, the working space can have a positive pressure applied thereto via the cleaning medium, which can be discharged through the at least one nozzle. It is conceivable for the rotation of the at least one nozzle supporting part and/or the rotary part to be caused and sustained solely by the cleaning medium flowing through the nozzle.

It may prove to be advantageous if provided at the working space is at least one opening for supplying or discharging an ambient medium via which a flow can be created in the working space. For example, the at least one opening can be what is known as an "external air opening" or "false air opening". Through the at least one opening, for example, a flow can be created in the working space, thereby achieving self-cleaning of the working chamber.

It is advantageous for the flow in the working space to be influenced. To this end, provision may be made, for example, for the number of openings that are open to be adjusted, controlled and/or regulated. Alternatively or in addition, provision may be made for the free cross-sectional area of at least one opening to be adjusted, in particular controlled and/or regulated.

It has proved advantageous for the at least one opening for supplying the ambient medium and the at least one opening for discharging the ambient medium to be positioned such that as homogeneous a flow as possible can be achieved in the working space. By way of example, annular or vortex flow may prove to be advantageous. The particles detached from the workpiece can be captured by the flow of the ambient medium and transported out of the working space. In a preferred embodiment, provision may be made for tangential outflow relative to an axis of the working space. Discharged dirt particles can be separated, for example, in a particle separator arranged downstream of the at least one outlet opening in the direction of flow.

The workpiece receptacle is provided for supporting the workpiece in the working space.

It is advantageous for the cleaning apparatus to comprise a sensor device for determining a contamination of the cleaning medium and/or of an ambient medium in a working space of the cleaning apparatus. By way of example, the number and/or the size of particles in the cleaning medium and/or in the ambient medium is determined via the sensor device. From this, it can be deduced whether the cleaning of the workpiece is effective.

Preferably, the sensor device is coupled to a control device of the cleaning apparatus and the cleaning apparatus can be controlled and/or regulated depending on a signal from the sensor device. This improves the cleaning effect and makes for a highly versatile cleaning apparatus.

Preferably, at least one of the following can be controlled and/or regulated: rotational speed of the rotary part, direction of rotation of the rotary part, rotational speed of at least one nozzle supporting part, direction of rotation of at least one nozzle supporting part, application of cleaning medium to the at least one nozzle, number and/or cross-section of openings of the working space, application of positive pressure and/or negative pressure to the working space, flow of the cleaning medium and/or ambient medium in the working space, at least one adjusting device, a vibrating device, a heating device and a cleaning unit (to be explained below).

Advantageously, the cleaning apparatus is adaptable in size and/or structure and/or nature to the intended cleaning task and in particular to the workpiece.

By way of example, the cleaning apparatus is, at least in part, of modular configuration, wherein at least one of the following applies:

- at least one nozzle supporting part is optionally mountable to, and releasable from, the rotary part or a holding part;
- the position of at least one nozzle supporting part on the rotary part or on a holding part is variable;
- at least one nozzle is mountable to and releasable from a nozzle supporting part;

at least one electrode is mountable to the cleaning apparatus and releasable therefrom, for example to the rotary part, to a nozzle supporting part or via a support part holding at least one electrode.

Adaptation of the cleaning apparatus can preferably be carried out by a user. In this regard, for example, provision may be made for components of the cleaning apparatus to be connected and/or released from each other by hand and/or without tools.

Moving the workpiece during the cleaning process is not absolutely necessary but may be advantageously provided depending on the peculiarity of the invention and/or depending on the particular cleaning task.

It is advantageous for the cleaning apparatus to comprise at least one adjustment device via which the workpiece is movable in operation of the cleaning apparatus.

In a corresponding manner, provision may be made for the cleaning apparatus to comprise at least one adjustment device with which a working chamber is movable in operation of the cleaning apparatus in whose working space are arranged the workpiece, the rotary part and the at least one nozzle supporting part.

The respective adjustment device can be configured in various ways, for example, electrically and/or pneumatically. It is conceivable for a controllable robot arm to be used for moving the workpiece and/or the working chamber. Preferably, the respective adjustment device allows a translational and/or rotational motion of the workpiece and/or the working chamber, preferably in six degrees of freedom.

It is advantageous for the cleaning apparatus to comprise at least one vibrating device via which the workpiece can be acted upon by vibrations. The cleaning result can thereby be improved. For example, the vibrations are vibrations of the workpiece, with which adhesive forces between the surface to be cleaned and the particulate contaminants are reduced. Oscillations can lead to an oscillation-dependent motion of the particles on the workpiece surface, enabling particles to be captured by the cleaning medium even in areas that are actually obscured from the cleaning medium (flow shadow regions, sheltered from the cleaning jet of the cleaning medium).

The vibrations can be generated in different ways. For example, an in particular magnetic oscillator, an in particular pneumatic unbalanced drive, an in particular mechanical beater or a shaker is used.

Vibrations can also be imparted to the workpiece or particles adherent thereto by way of sonic waves from the outside. For example, an ultrasonic device or a membrane is used to exert vibrations on the workpiece or the particles via sound.

The vibrations can be periodic or aperiodic.

Advantageously, the cleaning apparatus comprises a heating device with which for example the workpiece, the cleaning medium and/or the working chamber can be heated or cooled. Tempering of, for example, the cleaning medium can be achieved, for example, in a storage container or by continuous-flow tempering.

The cleaning apparatus can comprise cleaning units, for example for contact-type cleaning. For example, brushes or deburring tools are provided.

FIG. 1 shows an advantageous embodiment of a cleaning apparatus for cleaning a workpiece 12 in accordance with the invention and designated by the reference character 10. In the present example, the workpiece 12 is a mechatronic or electronic component part which has adhering to its surface small particulate contaminants, not shown in the drawing, generated as a result of the production process. For example, such contamination exists in the form of dust or powder.

A workpiece receptacle 13 is provided for the workpiece 12. Via the workpiece receptacle 13, the workpiece 12 can be held in a working chamber 14 of the cleaning apparatus 10 during the cleaning process. The working chamber 14 forms a working space 16 and comprises a wall 18 enclosing same.

The workpiece 12 can be fixed, preferably releasably fixed, on the workpiece receptacle 13 in different ways. For example, provision is made for fixing the workpiece 12 on the workpiece receptacle 13 in a force-locking manner and/or in a form-locking manner.

Formed on the working chamber 14 is an opening 20. The opening 20 is an outlet opening and forms a connection 22 for a fluid conduit. Connected into the fluid conduit is a negative pressure generating device 24. Via the negative pressure generating device 24, a negative pressure can be applied to the working chamber 16.

Furthermore, in a preferred embodiment, at least one further opening is provided at the working chamber 14. In the present case, two of them are provided, referred to as external air openings 26. Advantageously, the external air openings 26 are located opposite the opening 20 with respect to the positioning of the workpiece 12 in the working chamber 16.

The working space 16 can have an ambient medium admitted thereto via the external air openings 26 such that, when the external air openings 26 are open, ambient medium is allowed to flow into the working space 16 by the action of the negative pressure generating device 24.

The cleaning apparatus comprises a control device 28 which is in operative communication with the negative pressure generating device 24 and the external air openings 26. This affords the possibility of controlling and/or regulating the negative pressure in the working space 16. The external air openings 26 can be optionally opened or closed and, preferably, the respective free cross-section can be adjusted. This provides a way of controlling and/or regulating the flow of the ambient medium through the working space 16.

In the cleaning apparatus 10, the workpiece 12 can be acted upon by a cleaning medium and can additionally be acted upon electrically by use of electrodes, in order to remove the contaminants from the workpiece 12.

The cleaning apparatus 10 comprises a rotary part 30. The rotary part 30 is configured as a holding arm 32. The holding arm 32 is held to a drive shaft 34 which defines a main axis 36.

In order to drive the holding arm 32 about the main axis 36, the cleaning apparatus 10 comprises a drive device 38 which in the present case is, for example, of an electric configuration and comprises an electric motor.

Rotation in both rotational directions about the main axis 36 is conceivable. The direction of rotation can be predeterminable.

The drive device 38 is coupled to the control device 28 so that the rotational speed of the holding arm 32 about the main axis 36 can be controlled and/or regulated when the cleaning apparatus 10 is operating.

The cleaning apparatus 10 further comprises a nozzle supporting part 40 that is movably held to the holding arm 32. The nozzle supporting part 40 is configured as a nozzle arm 42 and is supported by the holding arm 32 for rotation about an axis of rotation 44. In the present case, the axis of rotation 44 is oriented parallel to the main axis 36.

Rotation in both rotational directions about the axis of rotation 44 is conceivable. The direction of rotation can be predeterminable.

Figure 2:
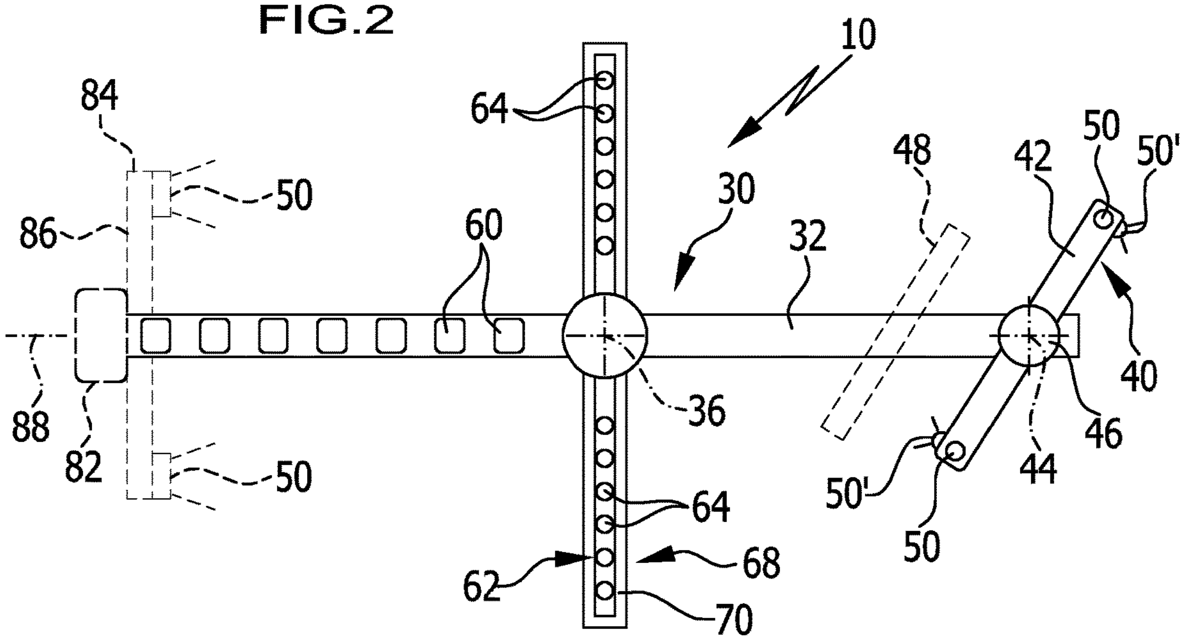
FIG. 2 shows, in top view, a rotary part and a nozzle supporting part as well as an electrode supporting part of the cleaning apparatus of FIG. 1.

The nozzle arm 42 in the present case is arranged at an end section 46 of the holding arm 32, at a distance relative to the main axis 36. In particular, it is conceivable for the position of the nozzle arm 42 on the holding arm 32 to be variable. To this end, provision may be made for the nozzle arm 42 to be released from the holding arm 32 and to be reconnected thereto at a different position depending in particular on the cleaning task. The broken line contour 48 of FIG. 2 shows an example of a different position of the nozzle arm 42 on the holding arm 32.

Alternatively or in addition, provision may be made for a further nozzle arm in addition to the nozzle arm 42 to be releasably connectable to the holding arm 32.

Preferably, the nozzle arm 42 can be mounted and released without tools and by hand.

It is conceivable that, instead of the nozzle arm 42, a different nozzle arm is used in order to adapt the apparatus 10 to a different cleaning task.

In the present case, two preferably identical nozzles 50 are arranged on the nozzle arm 42. The nozzles 50 are positioned at opposite end portions of the nozzle arm 42 and are at a distance, and therefore eccentrically, with relation to the axis of rotation 44, in particular spaced apart therefrom. Consequently, rotation of the nozzle arm 42 about the axis of rotation 44 also rotates the nozzles 50 about the axis of rotation 44. A cleaning medium for cleaning the workpiece 12 can be applied thereto via the nozzles 50. A respective nozzle 50 provides a cleaning jet of the cleaning medium and can be configured as a round jet nozzle or a flat jet nozzle for example.

In the present case, the cleaning medium is supplied to the nozzles 50 via the drive shaft 34, this being configured in the form of a hollow shaft. A rotary union 52 is formed in the area where the drive shaft 34 connects to the holding arm 32. The cleaning medium is allowed to flow through the rotary union 52 and via the holding arm 32 to the nozzle arm 42. Likewise, a rotary union 54 is formed in the area where the nozzle arm 42 connects to the holding arm 32. The cleaning medium passes through the nozzle arm 42 to the nozzles 50 and is emitted therefrom onto a surface 56 of the workpiece 12.

The cleaning apparatus 10 also comprises a drive device for driving the nozzle arm 42, said drive device in the present case being configured as a pneumatic drive device. Under the action of the cleaning medium applied to the nozzles 50, the nozzle arm 42 rotates relative to the holding arm 32 about the axis of rotation 44, for example as a result of jet force of the cleaning medium.

In the present case, the cleaning medium is in particular air. Other examples of working media have already been mentioned.

A provision device is provided for providing the cleaning medium, which provision device is a pressure generating device 58 which is shown schematically as being connected to the drive shaft 34. The pressure generating device 58 is in operative communication with the control device 28, which can control and/or regulate the operation of the pressure generating device 58. This affords the possibility of controlling and/or regulating the amount and/or the pressure of the cleaning medium when the cleaning apparatus 10 is operating.

The capability for adaptation of the cleaning apparatus 10 to the cleaning task has already been mentioned. In particular, in the holding arm 32, the possibility exists for varying the connection thereof to the drive shaft 34. This provides a way of varying the distance of the nozzle arm 42 from the main axis 36.

To this end, for example, the holding arm 32 can be selectively connected at positions as indicated by reference numeral 60 in the drawing. The connection is, for example, formed by a force-locking connection and/or a form-locking connection, for example by latching and/or clamping. Effecting and releasing said connection can be accomplished by the user, preferably by hand and without tools.

For adaptation to the cleaning task, it may further be provided that, in lieu of the rotary part 30, a different rotary part is connected to the drive shaft 34. Preferably, this different rotary part, too, provides the possibility of mounting or releasing a respective nozzle supporting part at different positions or of providing more than one nozzle supporting part.

The cleaning apparatus 10 further comprises a charge generating device 62. In the present case, the charge generating device 62 comprises a plurality of electrodes 64. Preferably, the electrodes 64 are of identical configuration and can have a direct voltage or an alternating voltage applied thereto by an electrical provision device 66. The electrodes 64 can be configured as direct voltage electrodes or alternating voltage electrodes.

In the present case, the electrodes 64 are held to a common support part 68. The support part 68 is connected to the holding arm 32 or the drive shaft 34 in rotationally fixed relation thereto. The support part 68 is thereby oriented with respect to the main axis 36. Rotation of the holding arm 32 rotates the support part 68 together with the holding arm 32 about the main axis 36. As a result, the electrodes 64 are also rotated about the main axis 36.

The support part 68 is configured as a support arm 70 which comprises, in each case, a plurality of electrodes 64 on sides of the holding arm 32 that face away from each other. In the present case, six electrodes are arranged on each side as an example, but it is understood that the number of electrodes 64 can be different.

In particular, in the cleaning apparatus 10, provision may be made that, in lieu of the support part 68, a different support part can be connected to the holding arm 32, depending on the cleaning task, and/or that an additional support part, preferably comprising a plurality of electrodes 64, is used. The additional support part is fixable to the holding arm 32 for example.

Connecting and releasing a support part 68 to and from the holding arm 32 is preferably performed by a user, in particular without tools and by hand.

In operation of the cleaning apparatus 10, the cleaning medium flows out of the nozzles 50 to act upon the workpiece 12. As a result of the outflowing cleaning medium, the nozzle arm 42 is rotated about the axis of rotation 44.

Provision may be made for the nozzle supporting part 40 to have at least one further nozzle 50 arranged thereon, whose direction of outflow is oriented transversely and in particular perpendicularly to the axis of rotation 44. Cleaning medium emerging from this nozzle can be provided solely for the purpose of imparting rotary motion to the nozzle arm 42 about the axis of rotation 44. FIG. 2 schematically shows such a pair of nozzles, designated by the reference numeral 50'.

It may be advantageous for the direction of outflow of the cleaning medium from the nozzles 50 to be parallel to the axis of rotation 44 and/or perpendicular to the surface 56, with a view to achieving maximum cleaning performance.

Via the amount of cleaning medium that is supplied to the nozzles 50 and/or the pressure thereof, the rotational speed of the nozzle arm 42 about the axis of rotation 44 can be controlled and/or regulated by the control device 28 when the cleaning apparatus is operating.

The holding arm 32 having the nozzle arm 42 arranged thereon is also rotated around the main axis 36. This leads to the nozzles 50 performing a superimposed motion, namely rotation about the axis of rotation 44 on the one hand and rotation about the main axis 36 on the other. This results in a pattern of application on the surface of the workpiece 12. The pattern of application depends in particular on the respective rotational speed of the nozzle arm 42 about the axis of rotation 44 and the rotational speed of the holding arm 32 about the main axis 36.

By influencing the rotational speeds using the control device 28, it is thus possible to create different patterns of application on the workpiece 12. The rotational speeds can be controlled and/or regulated by controlling and/or regulating the operation of the drive device 38 and the pressure generating device 58.

It has proved to be advantageous for the rotational speed about the main axis 36 to be lower than the rotational speed of the nozzle arm 42 about the axis of rotation 44.

Figure 3:
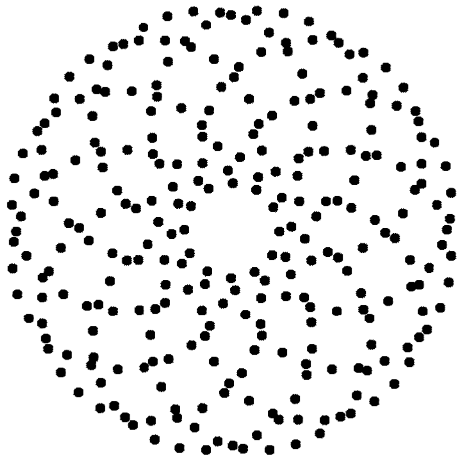
FIGS. 3 and 4 show relative positions, illustratively symbolized by dots, of nozzles of the cleaning apparatus of FIG. 1 and of a workpiece at different ratios of rotational speeds of the rotary part and the nozzle supporting part.
Figure 4:
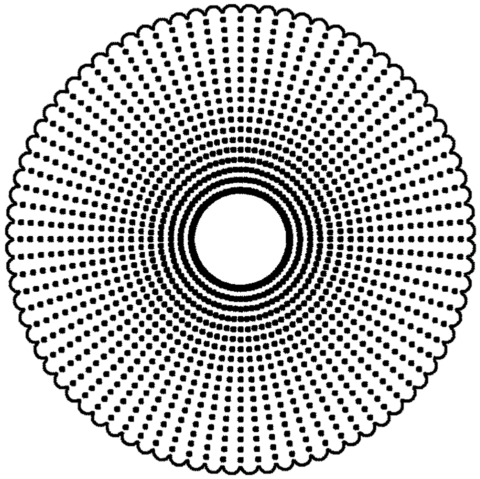

FIGS. 3 and 4 show examples of different application patterns, in which the dots represent the positions of the nozzles 50 above the surface of the workpiece 12 at different times.

In the illustration of FIG. 3, the holding arm 32 rotates at approximately 1 revolution per second and the nozzle arm 42 rotates at approximately 12 revolutions per second, about the axis of rotation 44.

In the illustration of FIG. 4, the holding arm 32 rotates at approximately 0.1 revolutions per second and the nozzle arm 42 rotates at approximately 12 revolutions per second, about the axis of rotation 44.

By the superimposed motion of the nozzles 50, the action of the cleaning medium upon the surface of the workpiece 12 can be spread over substantially an area thereof, while still allowing for the cleaning apparatus 10 itself to be of compact design and simple in structure.

The workpiece 12, in addition to having the particles cleaned off via the cleaning medium, has electrostatic energy applied thereto via the electrodes 64. In particular, the workpiece 12 can be ionized. Advantageously, the cleaning medium flowing out of the nozzles 50 is also ionized.

Via the electrodes 64, the workpiece 12 including particles adhering thereto can be charged and/or discharged so that the particles are more easily detached. Detachment occurs, for example, via the cleaning medium. Preferably, the particles can also be detached by an opposite electrical polarity of the electrodes 64 relative to the polarity of the particles.

When the holding arm 32 rotates, the electrodes 64, because of their arrangement on the support part 68, also rotate about the main axis 36. In this way, the electrical action upon the workpiece 12 can also be spread over substantially an area thereof, accompanied by discharging or charging the workpiece 12 over substantially an area thereof, using relatively lesser electrodes.

In operation of the cleaning apparatus 10, the cleaning medium flowing out of the nozzles 50 acts upon the workpiece 12. The cleaning medium can be discharged from the working space 16 via the negative pressure generating device 24. To this end, ambient medium flow through the working space 16 as explained above is advantageous.

The representation of the drawing is schematic. By way of example, the openings 20 and 26 can be arranged such that as homogeneous a flow as possible is created in the working space 16. In an advantageous implementation, for example, annular or vortex flow may prove to be advantageous. Provision may be made for the opening 20 to be positioned for tangential outflow from the working space 16.

Entrained particles can be discharged by the ambient medium from the working space 16 and separated, for example, in a particle separator located downstream of the opening 20 in the direction of flow.

To assist in cleaning the workpiece 12, the cleaning apparatus 10 can comprise further devices, as are schematically shown in the drawing.

For example, a vibrating device 72 is provided. The vibrating device 72 is, for example, arranged on the workpiece 12 and is in contact therewith. Provision may be made for the vibrating device 72 to comprise or form the workpiece receptacle 13 mentioned above.

The workpiece 12 can be oscillated by way of the vibrating device 72. These oscillations, for example, cause detachment of the particles from the workpiece 12. Furthermore, the particles can be moved along the surface of the workpiece 12 in order to be captured by the cleaning jet of the nozzles 50. This, for example, opens up the possibility of getting the workpiece 12 cleaned even in flow shadow areas.

The cleaning apparatus 10 can comprise an adjustment device 74 for moving the workpiece 12 in the working space 16.

Alternatively or in addition, an adjustment device 76 may be provided for moving the working chamber 14, for example together with the holding arm 32, the nozzle arm 42 and the support arm 70.

The adjustment devices 74, 76 preferably allow a translational motion and/or a rotational motion of the workpiece 12 or the working chamber 14 respectively, preferably in six degrees of freedom.

Further, a heating device 78 may be provided. Using the heating device 78, the cleaning medium, the ambient medium and/or the workpiece 12 can be heated and/or cooled with a view to improved cleaning of the workpiece 12.

As has already been explained, the control device 28 can be coupled to the vibrating device 72, the adjustment device 74, the adjustment device 76 and/or the heating device 78 in order to control and/or regulate the respective operation thereof.

Preferably, the cleaning apparatus 10 comprises a sensor device 80 coupled to the control device 28. The sensor device 80 is arranged, for example, downstream of the connection 22 on the fluid conduit. Via the sensor device 80, the quality of the cleaning medium and/or of the ambient medium can be determined. In particular, it is possible to determine the extent to which the medium has become contaminated by impurities.

A signal from the sensor device 80 can be fed to the control device 28. The control device 28 can control and/or regulate the operation of the cleaning apparatus 10 depending on that signal.

Shown in FIG. 2 is a schematic top view of the holding arm 32 and the nozzle arm 42. Indicated by the broken line illustration is a further holding arm 82 provided on the rotary part 30. The holding arm 82 in the present case is arranged at the end of the holding arm 32 that is opposite to the nozzle supporting part 40. The holding arm 82 is oriented at an angle and in particular perpendicularly to the holding arm 32.

By way of example, the holding arm 82 can have arranged thereon a further nozzle supporting part 84, and this can form a further nozzle arm 86.

Arranged on the nozzle arm 86 is preferably at least one further nozzle 50; here again, two of these are present for example.

The nozzle arm 86 is mounted to the holding arm 82 for rotation about an axis of rotation 88 relative to which the nozzles 50 are arranged at a distance and therefore eccentrically. Preferably, as with the nozzle arm 42, rotation can again occur under the action of the cleaning medium flowing out of the nozzles 50.

The axis of rotation 88 is oriented transversely and in particular perpendicularly to the main axis 36. As the the nozzle arm 86 rotates, the nozzles 50 arranged thereon are caused to rotate about the axis of rotation 88 and additionally about the main axis 36.

Utilizing the additional nozzle arm 86 can improve the cleaning action on the workpiece 12, which latter can additionally have the cleaning medium acting thereupon from the side.

It is understood that at least one (further) electrode can be arranged on the holding arm 82 in addition to or as an alternative to the electrodes 64 on the support part 68. Advantageously, a plurality of electrodes 64 are arranged on a further support part which can be fixed, for example, to the holding arm 82.

Figure 5:
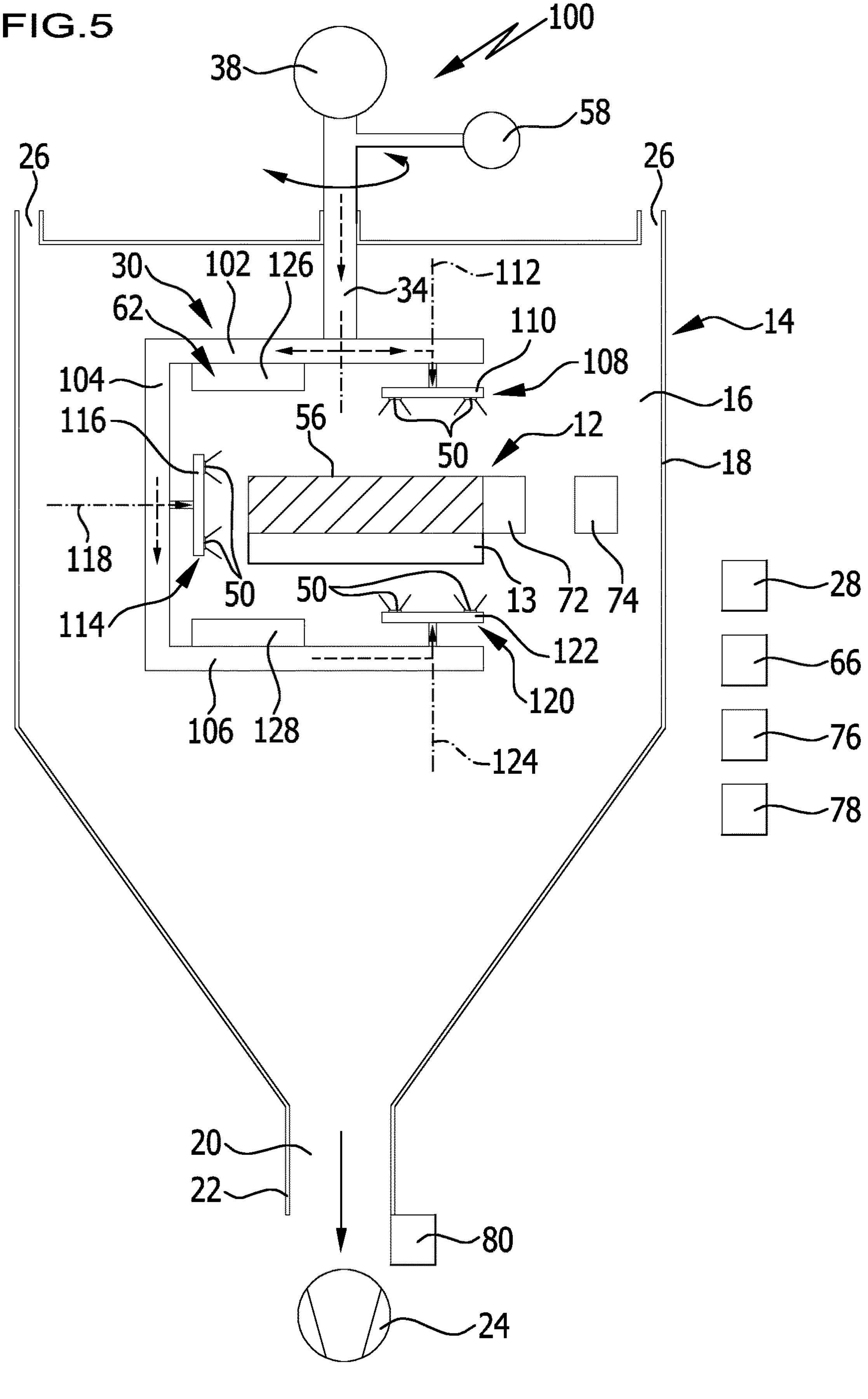
FIG. 5 shows a schematic representation of another cleaning apparatus in accordance with the invention.

FIG. 5 shows an advantageous embodiment of the cleaning apparatus according to the invention, designated by the reference numeral 100. The same reference numeral are used to indicate features and component parts that are identical or functionally equivalent between the cleaning apparatuses 10 and 100. The advantages achievable with the cleaning apparatus 10 can also be achieved with the cleaning apparatus 100. Reference may be had to the above explanations in order to avoid repetition. Only the major differences will be discussed herein.

In the cleaning apparatus 100, the rotary part 30 has a first section 102, a second section 104 and a third section 106. The first section 102 and the third section 106 are opposite to one another with respect to the workpiece 12, i.e. the workpiece 12 is arranged between the sections 102 and 106.

The sections 102 and 106 are connected together via the second section 104. The section 104 is arranged at an angle and in particular perpendicularly to the sections 102 and 106 in each case. Therefore, in a side view, the rotary part 30 in the cleaning apparatus 100 is of a substantially U-shaped configuration.

Arranged at the first section 102 is a nozzle supporting part 108, this being configured as a nozzle arm 110 and rotatable about an axis of rotation 112. Arranged at the second section 104 is a nozzle supporting part 114, this being configured as a nozzle arm 116 and rotatable about an axis of rotation 118. Arranged at the third section 106 is a nozzle supporting part 120, this being configured as a nozzle arm 122 and rotatable about an axis of rotation 124. Preferably, the nozzle supporting parts 108, 114 and 120 are of identical configuration.

In the present case, each nozzle arm 110, 116 and 122 has arranged thereon two nozzles 50, arranged at a distance, and hence eccentrically, to the respective axis of rotation. It is understood that their number could also be different.

By way of example, the rotation axes 112 and 124 can coincide and are oriented parallel to the main axis 36. The axis of rotation 118 is, for example, arranged transversely and in particular perpendicularly to the main axis 36.

Preferably, the nozzle arms 110, 116 and 122 are each driven under the action of the outflowing cleaning medium. In addition to rotation about the respective axis of rotation 112, 116 and 124, the nozzles 50 are, as in the case of the cleaning apparatus 10, rotated about the main axis 36 as a result of the rotation of the rotary part 30.

The workpiece 12 can be acted upon by the cleaning medium on opposing surfaces 56 thereof via the nozzles on the nozzle arms 110 and 122. The workpiece 12 is additionally acted upon from the side via the nozzles on the nozzle arm 116.

In the cleaning apparatus 100, two electrodes 126, 128 are present. The electrode 126 is arranged on the first section 102 and is opposite to the nozzle arm 112 with respect to the main axis 36. Correspondingly, the electrode 128 is arranged on the third section 106 and is opposite the nozzle arm 122 with respect to the main axis 36.

By the electrodes 126, 128 of the charge generating device 62, the workpiece 12 can be discharged or charged on surfaces thereof that face away from each other. By the respective distance of the electrodes 126, 128 from the main axis 36 it is ensured that, as the rotary part 30 rotates, as large an area as possible of the workpiece 12 is covered thereby.

In particular, provision may be made for the electrodes 126, 128 to be counter electrodes corresponding to one another and being of different electrical polarities.

In the following, a further advantageous embodiment of the cleaning apparatus according to the invention, designated by the reference numeral 130, will be discussed in more detail. Again, the same reference numerals are used to indicate features and component parts that are identical or functionally equivalent. Only the major differences with respect to the cleaning apparatuses 10 and 100 will be discussed here.

Figure 6:
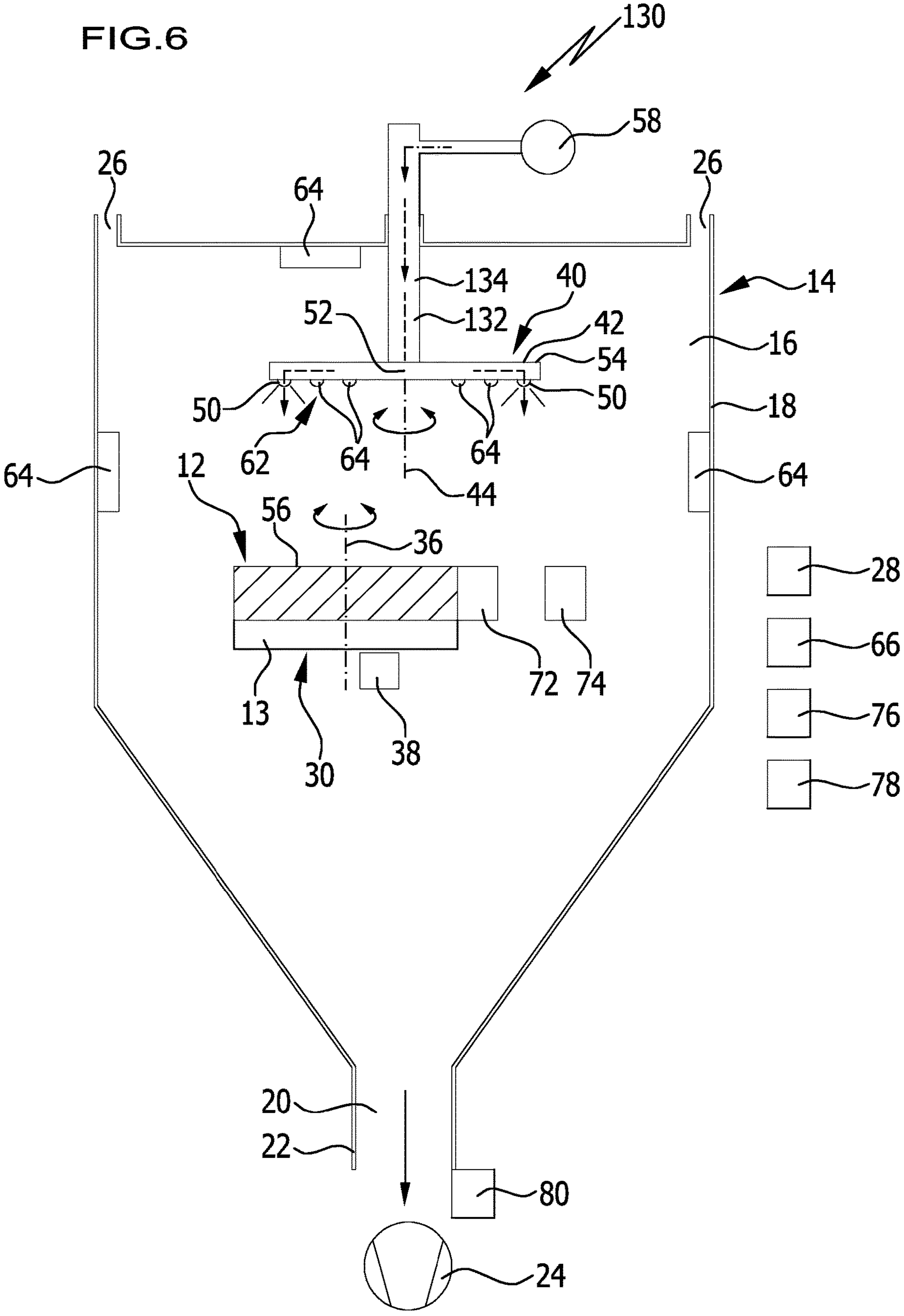
FIG. 6 shows a schematic representation of a cleaning apparatus in accordance with the invention.

The cleaning apparatus 130 in accordance with FIG. 6 differs from the cleaning apparatuses 10 and 100 in particular in that the rotary part 30 is formed by or held to the workpiece receptacle 13. The rotary part 30 and hence the workpiece 12 can rotate about the main axis 36 by way of the drive device 38.

As with the previous embodiments, the main axis 36 is different from the axis of rotation 44 and, in the present example, is oriented parallel thereto. As with the previous embodiments, the nozzles 50 of the nozzle supporting part 40 are at a distance relative to the axis of rotation 44. In this way, the surface 56 of the workpiece 12 can be acted upon in a grid-like or net-like manner, as has been explained above.

The drive device 38 can be configured in a variety of ways. In practice, for example, an electrical configuration thereof may prove advantageous.

It is understood that the cleaning apparatus 130 also allows operating all or part of the component parts under the control of the control device 28.

The nozzle supporting part 40 comprises the nozzle arm 42. In the present case, as with the variant in accordance with FIGS. 1 and 5, the nozzle arm 42 is divided into two sections that lie opposite to each other with respect to the axis of rotation 44.

The nozzle supporting part 40 is fixed via a holding part 132. In the present case, the holding part 132 is immovably fixed to the wall 18. The holding part 132 is stationary with respect to the working chamber 14.

The nozzle arm 42 is mounted for rotation on the holding part 132. Here, the nozzle arm 42 is preferably driven under the action of the outflowing cleaning medium. As an alternative or in addition, an additional drive can be provided, which may be, for example, electric and/or pneumatic.

The holding part 132 in the present case is configured as a hollow body 134. The cleaning medium is passed from the pressure generating device 58 through the hollow body 134 to the nozzles 50.

The cleaning apparatus 130 is also provided with the charge generating device 62. By way of example, electrodes 64 are arranged on the nozzle arm 42. Also shown in the drawing is, as an example, the arrangement of electrodes 64 stationarily positioned on the working chamber 14. Here, the electrodes 64 are fixed to the wall 18.

Of course, in a preferred embodiment of the cleaning apparatus according to the invention, provision may be made for a rotary part 30 to be used at or to be formed by the workpiece receptacle 13, wherein more than one nozzle supporting part 40 is present, which latter case has been described previously using the example of the embodiment in accordance with FIG. 5. For example, provision may be made for nozzle supporting parts 40 that have nozzles 50 above and below the workpiece 12 and/or adjacent a side of the workpiece 12. The charge generating device 62 can comprise electrodes 64 above, below and/or adjacent a side of the workpiece 12. In particular, counter electrodes may also be provided as has been explained above.

In the cleaning apparatus 130, a different holding device can be provided for the electrodes 64. For example, a support part can be used which is configured, for example, like the support arm 70 and is rotatably held together with the nozzle arm 42 to the holding part.

Provision may be made for the cleaning apparatus 130 to be, at least in part, of a modular configuration, as has been explained using the example of the cleaning apparatus 10. For example, nozzles 50, the nozzle arm 42 and/or electrodes 64 can be added, eliminated or repositioned.

LIST OF REFERENCE NUMERALS

10 cleaning apparatus
12 workpiece
13 workpiece receptacle
14 working chamber
16 working space
18 wall
20 opening
22 connection
24 negative pressure generating device
26 external air opening
28 control device
30 rotary part
32 holding arm
34 drive shaft
36 main axis
38 drive device
40 nozzle supporting part
42 nobble arm
44 axis of rotation
46 end section
48 broken line contour
50 nozzle
52 rotary union
54 rotary union
56 surface
58 pressure generating device
60 position
62 charge generating device
64 electrode
66 electrical provision device
68 support part
70 support arm
72 vibrating device
74 adjustment device
76 adjustment device
78 heating device
80 sensor device
82 holding arm
84 nozzle supporting part
86 nozzle arm
88 axis of rotation
100 cleaning apparatus
102 first section
104 second section
106 third section
108, 114, 120 nozzle supporting part
110, 116, 122 nozzle arm
112, 118, 124 axis of rotation
126, 128 electrode
130 cleaning apparatus
132 holding part
134 hollow body

The invention claimed is:

1. Cleaning apparatus for cleaning workpieces, comprising:
- a workpiece receptacle,
- a rotary part rotatable about a main axis by way of an electric motor,
- at least one nozzle supporting part rotatable about an axis of rotation different from the main axis and on which at least one nozzle is arranged or formed at a distance relative to the axis of rotation, via which nozzle the workpiece can be acted upon by a cleaning medium, a charge generating device having at least one electrode for at least one of electrostatic charging and discharging of at least one of the workpiece and the cleaning medium, wherein the at least one nozzle supporting part is held for rotation on the rotary part.

2. The cleaning apparatus in accordance with claim 1, wherein the main axis and the axis of rotation of at least one nozzle supporting part are oriented parallel to each other.

3. The cleaning apparatus in accordance with claim 1, wherein the main axis and the axis of rotation of at least one nozzle supporting part are oriented at an angle to one another.

4. The cleaning apparatus in accordance with claim 1, wherein the cleaning apparatus comprises a plurality of nozzle supporting parts, each having at least one nozzle.

5. The cleaning apparatus in accordance with claim 4, wherein, in the case of two or more nozzle supporting parts, provision is made for at least one nozzle supporting part to be positioned above or below the workpiece and for at least one nozzle supporting part to be positioned adjacent a side of the workpiece.

6. The cleaning apparatus in accordance with claim 1, wherein the main axis is oriented perpendicularly to a plane defined by the workpiece receptacle or wherein the main axis is oriented parallel to a plane defined by the workpiece receptacle or lies in this plane.

7. The cleaning apparatus in accordance with claim 1, wherein the axis of rotation is oriented perpendicularly to a plane defined by the workpiece receptacle or wherein the axis of rotation is oriented parallel to a plane defined by the workpiece receptacle or lies in this plane.

8. The cleaning apparatus in accordance with claim 1, wherein at least one of the following is provided as the cleaning medium:

a gas;

a liquid;

a particulate cleaning medium;

a mixed medium, for example gas/liquid, liquid/solid or gas/solid.

9. The cleaning apparatus in accordance with claim 1, wherein a capability for non-contact cleaning is provided.

10. The cleaning apparatus in accordance with claim 1, wherein the cleaning apparatus comprises a drive device for the at least one nozzle supporting part which is configured as at least one of the following:

an electric motor;

a pneumatic motor;

a drive relying on a differential pressure of the cleaning medium flowing through the at least one nozzle relative to a pressure of an ambient medium in a working chamber of the cleaning apparatus which can have the ambient medium admitted thereto via at least one opening;

a drive relying on jet forces of the cleaning medium ejected through the at least one nozzle.

11. The cleaning apparatus in accordance with claim 1, wherein the at least one nozzle supporting part comprises at least one nozzle having a direction of outflow for the cleaning medium that is oriented transversely to the axis of rotation.

12. The cleaning apparatus in accordance with claim 1, wherein the workpiece being acted upon by the cleaning medium issuing under pressure from the at least one nozzle and/or wherein the workpiece being acted upon by cleaning medium entering the at least one nozzle using negative pressure.

13. The cleaning apparatus in accordance with claim 1, wherein the at least one nozzle supporting part is supported for rotation by a non-driven holding part.

14. The cleaning apparatus in accordance with claim 1, wherein at least one of at least one direct voltage electrode and at least one alternating voltage electrode is provided as the electrode.

15. The cleaning apparatus in accordance with claim 1, wherein the charge generating device comprises a plurality of electrodes and/or wherein at least one of the at least one electrode is arranged on one of the rotary part;

a nozzle supporting part;

a drive shaft of the cleaning apparatus carrying the rotary part;

a location spatially remote from the rotary part and from the nozzle supporting part.

16. The cleaning apparatus in accordance with claim 1, wherein the charge generating device is configured for ionizing an ambient medium within a working chamber for the workpiece.

17. The cleaning apparatus in accordance with claim 1, wherein the charge generating device is configured for ionizing the cleaning medium and wherein the workpiece can be acted upon by the ionized cleaning medium.

18. The cleaning apparatus in accordance with claim 1, wherein the cleaning apparatus comprises a control device with which at least one of a rotational speed of the rotary part about the main axis and a rotational speed of at least one nozzle supporting part about an axis of rotation is adjustable.

19. The cleaning apparatus in accordance with claim 1, wherein the cleaning apparatus comprises a working space for receiving the workpiece, in which working space are received the rotary part and the at least one nozzle supporting part, and comprises at least one opening for applying a positive pressure or a negative pressure to the working space;

at least one supplying or discharging opening for supplying or discharging an ambient medium via which a flow is creatable in the working space.

20. The cleaning apparatus in accordance with claim 19, wherein the at least one electrode is received in the working space.

21. The cleaning apparatus in accordance with claim 19, wherein the at least one opening for supplying the ambient medium and the at least one opening for discharging the ambient medium are positioned such that an annular flow or vortex flow is creatable in the working space.

22. The cleaning apparatus in accordance with claim 1, wherein the cleaning apparatus comprises a sensor device for determining a contamination of at least one of the cleaning medium and an ambient medium in a working space of the cleaning apparatus, which sensor device is coupled to a control device of the cleaning apparatus, and wherein the cleaning apparatus is at least one of controllable regulatable depending on a signal from the sensor device.

23. The cleaning apparatus in accordance with claim 1, wherein the cleaning apparatus is, at least in part, of modular configuration and wherein at least one of the following applies:

at least one nozzle supporting part is optionally mountable to, and releasable from, the rotary part or a holding part;

the position of at least one nozzle supporting part on the rotary part or on a holding part is variable;

at least one nozzle is mountable to and releasable from a rotary part;

at least one electrode is mountable to the cleaning apparatus and releasable therefrom.

24. The cleaning apparatus in accordance with claim 1, wherein the cleaning apparatus comprises at least one adjustment device via which the workpiece receptacle is movable in operation of the cleaning apparatus.

25. The cleaning apparatus in accordance with claim 1, wherein the cleaning apparatus comprises at least one adjustment device with which a working chamber is movable in operation of the cleaning apparatus in which working space are arranged the workpiece, the rotary part and the at least one nozzle supporting part.

26. The cleaning apparatus in accordance with claim 1, wherein the cleaning apparatus acts on the workpiece, directly or indirectly, by vibrations.

27. Cleaning apparatus for cleaning workpieces, comprising:

a workpiece receptacle, a rotary part rotatable about a main axis by way of a pneumatic motor, at least one nozzle supporting part rotatable about an axis of rotation different from the main axis and on which at least one nozzle is arranged or formed at a distance relative to the axis of rotation, via which nozzle the workpiece can be acted upon by a cleaning medium, a charge generating device having at least one electrode for at least one of electrostatic charging and discharging of at least one of the workpiece and the cleaning medium, wherein the at least one nozzle supporting part is held for rotation on the rotary part.

28. A cleaning apparatus for cleaning workpieces, comprising:

a workpiece receptacle, a rotary part rotatable about a main axis by way of a pneumatic motor, at least one nozzle supporting part rotatable about an axis of rotation different from the main axis and on which at least one nozzle is arranged or formed at a distance relative to the axis of rotation, via which nozzle the workpiece can be acted upon by a cleaning medium, a charge generating device having at least one electrode for at least one of electrostatic charging and discharging of at least one of the workpiece and the cleaning medium, wherein the at least one nozzle supporting part is held for rotation on the rotary part and wherein the at least one nozzle supporting part comprises at least one nozzle having a direction of outflow for the cleaning medium that is oriented transversely to the axis of rotation.

* * * * *